March 28, 1967 W. H. ZIMMERMAN 3,311,322

SERVOMECHANISMS RESPONSIVE TO A HEAT SOURCE

Filed Sept. 17, 1964 2 Sheets-Sheet 1

INVENTOR.
WARD H. ZIMMERMAN
BY Ernest F. Adams
ATTORNEY

SERVOMECHANISMS RESPONSIVE TO A HEAT SOURCE

Filed Sept. 17, 1964 2 Sheets-Sheet 2

INVENTOR.
WARD H. ZIMMERMAN
BY Everett F. Adams
ATTORNEY

United States Patent Office 3,311,322
Patented Mar. 28, 1967

3,311,322
SERVOMECHANISMS RESPONSIVE TO A HEAT SOURCE

Ward H. Zimmerman, Seattle, Wash., assignor to The Boeing Company, Seattle, Wash., a corporation of Delaware Filed Sept. 17, 1964, Ser. No. 397,217
15 Claims. (Cl. 244—1)

This invention relates to servomechanisms and more particularly to servomechanisms responsive to a heat source.

There are numerous applications for devices which can orient a body towards a heat source, such as the sun. One use for such devices is a control system for a space vehicle; another, is to maintain solar devices, for example solar cells, mounted on a movable body in a position to receive maximum sunlight and thereby provide the greatest power. Prior art attempts, particularly directed towards the latter application, have used heat responsive servomechanisms which are actuated by exposure to sunlight to position the body carrying the solar devices. Selective exposure and shadowing of the heat responsive elements has been provided by proper positioning of fixed shadow elements or shields on the body. Thus, when the sun moves relative to the body and the shields, the heat responsive members are exposed and actuated so as to produce a torque on the body for repositioning it. Since the shield also moves so as to shadow the actuator, it produces a counter-rotation of the body and thus the repositioning of the body is oscillatory. Depending upon the responsiveness of the actuating element, which is preferably rapid, the amplitude of the oscillation may produce an undesirable condition. This condition can easily become critical when the body is large, such as a space vehicle.

Accordingly, it is an object of this invention to provide a heat responsive servomehcanism for providing damped repositioning control.

It is another object of this invention to provide a heat responsive servomechanism for use on a body in which a bimetallic actuating element repositions the body and the motion of the body is damped by a bimetallic movable shadow element.

It is a further object of this invention to provide a body having a plurality of heat responsive servomechanisms mounted thereon, wherein the servomechanisms are used to provide damped attitude control of the body.

Briefly stated, in accordance with a preferred embodiment of the invention, there is provided a radiant heat responsive servomechanism for mounting on a body including bimetallic actuating means for producing movement of the actuating means and thereby positioning of the body when exposed to a heat source, a fixed shadow element or shield positioned so as to expose or shadow the bimetallic portion of the actuating means depending upon the position of the heat source relative to the body, and a movable bimetallic shadow element or shield having a responsiveness so as to effect a damping action of the oscillatory positioning of the body.

The novel features believed characteristic of the invention are set forth in the appended claims. The invention itself, together with further objects and advantages thereof, may best be understood with reference to the following description, taken in conjunction with the attached drawings in which:

Figures 3, 4, 5:
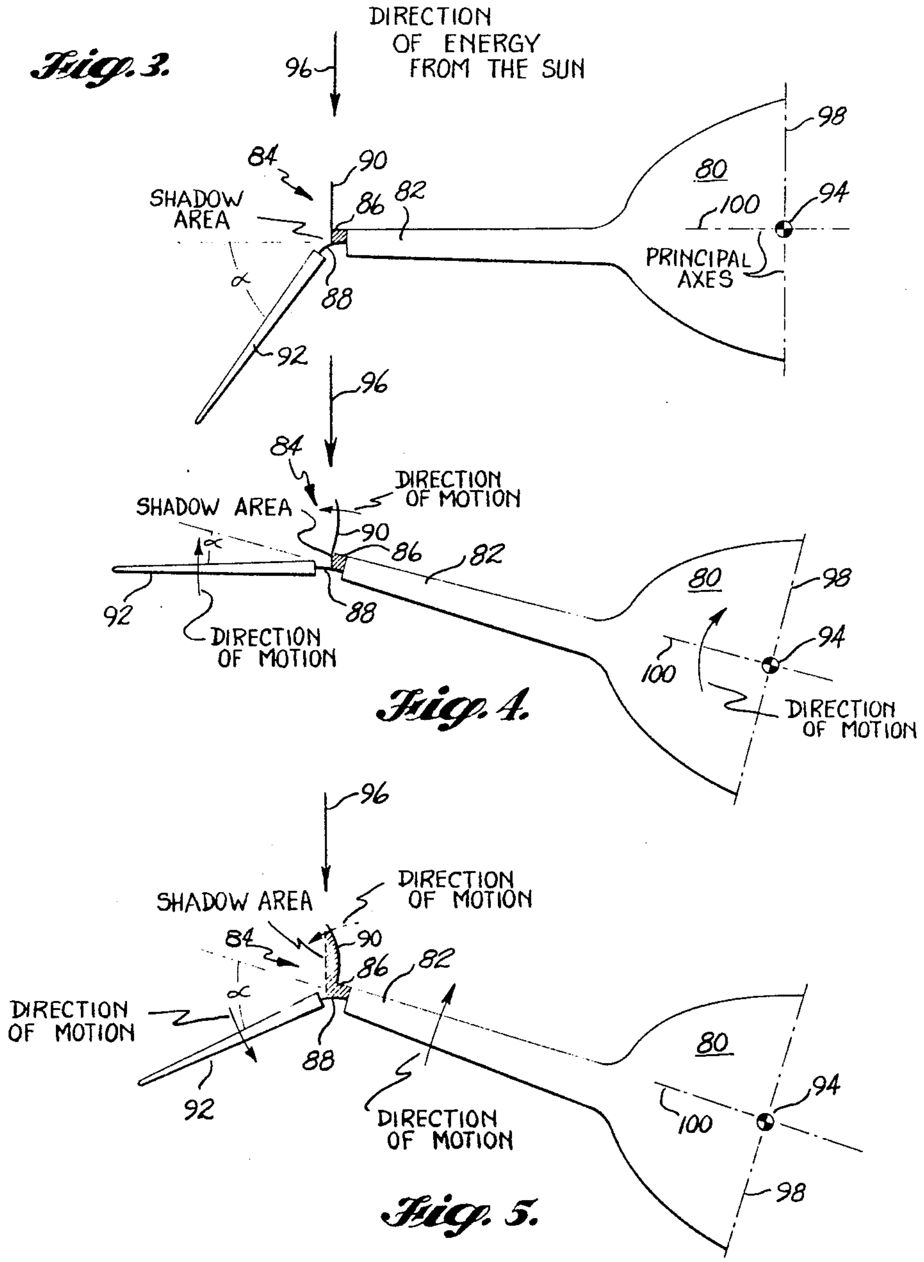
FIGURE 3 is a side elevation view of the vehicle body having a radiant heat responsive servomechanism mounted thereon, the body being shown in a steady-state attitude.

FIGURE 4 is a side elevation view of a vehicle body having a radiant heat responsive servomechanism mounted thereon, the body being shown in an early phase of vehicle rotation relative to the heat source; and FIGURE 5 is a side elevation view of a vehicle body having a radiant heat responsive servomechanism mounted thereon, the body being shown in a later phase of vehicle rotation relative to a heat source.

Figures 1, 2:
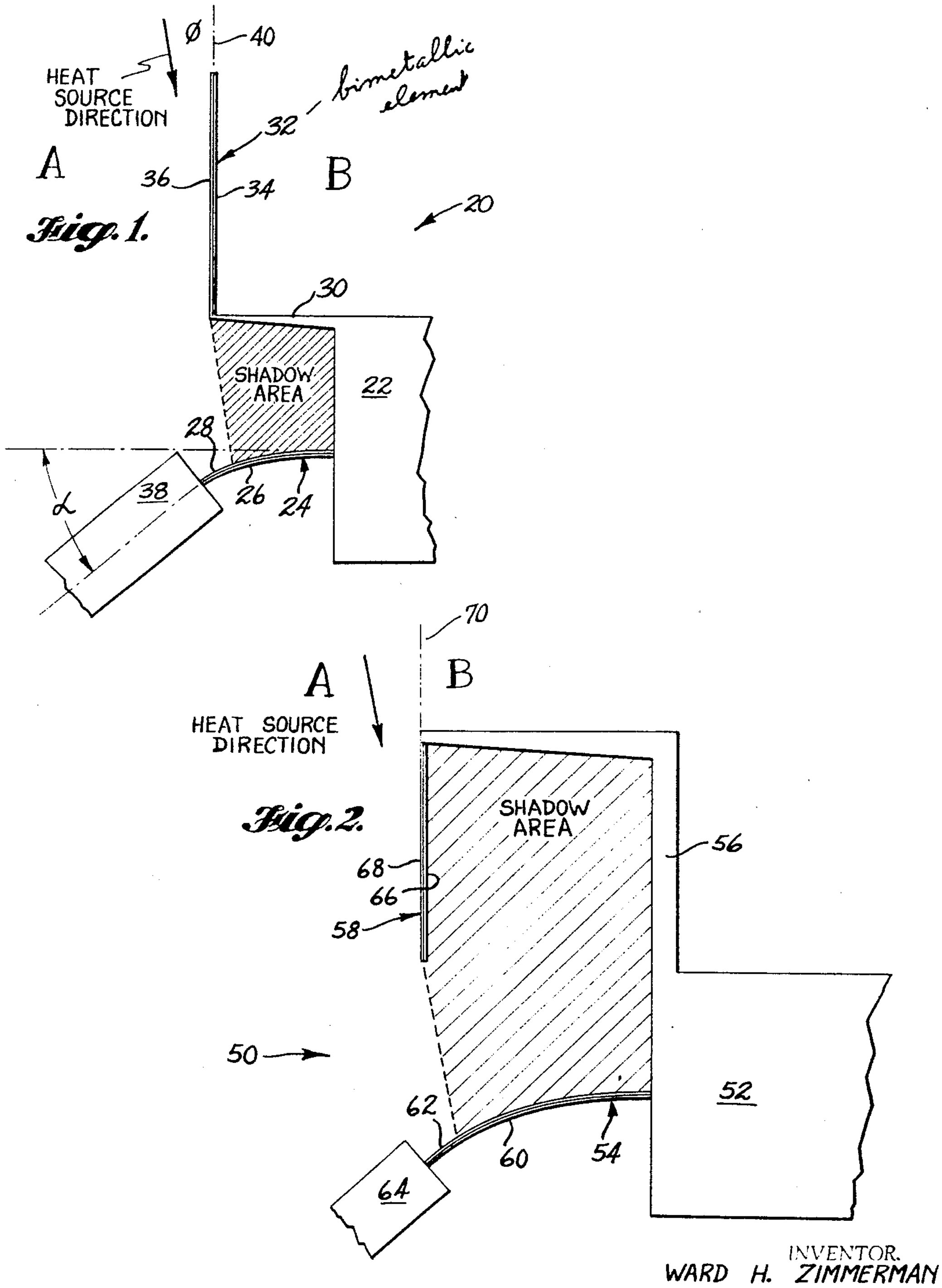
FIGURE 1 is a side elevation view of one embodiment of a radiant heat responsive servomechanism.
FIGURE 2 is a side elevation view of another embodiment of a radiant heat responsive servomechanism.

Referring now to FIGURE 1, there is shown a servomechanism 20 which is responsive to energy from a radiant heat source. The servomechanism or device 20 comprises a base member 22 carrying an actuating means 24. The actuating means 24, in this particular embodiment, comprises a bimetallic hinge element which includes a high-expansion metallic layer 26 and a low-expansion metallic element 28. The bimetallic element 24 moves in response to radiant heat applied thereto so that the differential expansion between the two layers will cause the element to rotate about its fixed end in a manner common to thermostatic-type elements.

A fixed shadow means comprising a shadow element 30 is also carried by base member 22. The shadow member 30 is positioned so as to be generally disposed between the heat source and the actuating means 24. Shadow element 30 carries a movable shadow means 32 comprising a bimetallic element which is mounted substantially perpendicular to the fixed shadow element 30. The bimetallic element 32 comprises two metallic layers 34 and 36. Metallic layer 34 is a high-expansion layer as compared to layer 36 so that upon application of heat to the movable shadow element 32 the entire element will deflect in a direction away from the base member 22, counter-clockwise as viewed in FIGURE 1. Moreover, in this embodiment, the metallic layer 34 is made of an essentially non-absorptive or reflective material, while the metallic layer 36 is constructed of a material which is relatively more heat absorptive. As so constructed, a heat source which is oriented so that energy strikes metallic layer 34 will not cause deflection; however, when the heat source is oriented so that energy is applied to metallic layer 36, heat will be absorbed, and the element will deflect. The direction of deflection can be controlled by the position of the high and low expansion layers.

A device 38, which produces a torque on the base member 22 tending to change the position or attitude of the base member is mounted on the free or outer end of actuating means 24. The device 38 may be any one of a number of devices, such as solar pressure vanes if the servomechanism comprises a portion of a space vehicle control system.

In operation, the servomechanism 20 functions so that actuating means 24 positions the device 38 relative to base member 22 depending upon the orientation of a heat source relative to the servomechanism 20. An axis 40, which is substantially coincident with the axis of movable shadow element 32 in its non-deflected position, serves as a reference for the position of the heat source relative to the servomechanism 20. A first position for the heat source comprises the area or sector A, to the left of axis 40 as viewed in FIGURE 1, in which some portion of the actuating means 24 is exposed to the heat source. A second position comprises the area or section B which, as viewed in FIGURE 1, lies to the right of axis 40. When the heat source is in area B, the fixed shadow element 30 completely shadows the actuating means 24 so that no energy from the heat source strikes the bimetallic actuating means. Consequently, the actuating means is inoperative. As the relative position between the heat source and the servomechanism 20 changes, such that the heat source enters sector A, the bimetallic actuating means 24 is exposed to the energy from the heat source. As shown in FIGURE 1, for example, the direction of the energy from the heat source may lie at an angle $\phi$, measured from axis 40. At this angle, a portion of the actuating means is exposed to the energy from the heat source causing the element 24 to rotate in the direction of the heat source. An increase in the angle $\phi$ further exposes element 24 to the heat source and thereby produces a further rotation of element 24 and a new position of device 38 closer to the heat source.

In the first position, sector A, the heat source also exposes metallic layer 36 of movable shadow element 32. Since metallic layer 36 is heat absorptive, the bimetallic element 32 will deflect away from axis 40. However, the bimetallic element 32 has a delayed rate of movement relative to the movement of the actuating means 24 because of a lesser responsiveness to the energy from the heat source. This lesser responsiveness may be provided by bonding an extremely thin layer of insulation on metallic layer 36. In this manner, the deflection of bimetallic member 32 is delayed so that a given portion of the actuating means 24 is exposed to the heat source before any deflection of member 32 occurs. The effect of the movement of element 32 in positioning the base member is explained more fully hereinafter.

In FIGURE 2, an alternate configuration of a servomechanism 50 responsive to a radiant heat source is shown. Device 50 comprises a base member 52, an actuating means 54 carried by the base member 52, a fixed shadow element 56 also carried by base member 52 and a movable or deflectable shadow element 58 which downwardly depends from the outer end of fixed shadow element 56. The actuating means 54 comprises a bimetallic element including a high-expansion layer 60 and a low-expansion layer 62. As in the previous configuration, the actuating means or bimetallic element 54 moves in a direction towards a radiant heat source due to the positioning of the metallic layers 60 and 62. Supported on the free end of actuating means 54 is a device or element 64 which is adapted to change the position of base member 52. The movable shadow means 58 also comprises a bimetallic element having a high-expansion layer 66 positioned with respect to a low-expansion layer 68 so as to provide damping or rate control of bimetallic actuating means 54. For describing the operation of servomechanism 50, an axis 70 is defined which separates the regions in which the heat source may be located relative to the servomechanism into a first position A and a second position B. An advantage of the configuration shown in FIGURE 2 is that the metallic layer 66 is not necessarily constructed of a material which is reflective or non-absorptive, as in the previous configuration, since the fixed shadow element 56 completely shadows the movable shadow element 58 at all times that the heat source is in the second position B.

In operation, as a radiant heat source moves relative to the servomechanism 50 from the second position or sector B to the first position or sector A, a portion of the actuating means 54 is exposed to energy from the heat source. The actuating means 54, upon exposure to the heat source, rotates about its end carried by base member 52 so as to move element 64 towards the heat source. The damping element 58 being slightly insulated is less responsive to the heat source and its movement is delayed relative to the movement of actuating means 54. Like the first servomechanism embodiment, deflection of damping element 58 partially shadows that portion of actuating means 54 which is exposed as the heat source moves further into sector A. Partial shadowing results because the element which shadows the actuating means 54 during all times in which the heat source is in the first portion A is the movable shadow element 58. Since the free end of element 58 defines the furthest projection interposed between the heat source and the actuating means 54, its deflection increases the shadow area on the actuating means 54. However, the damping element 58 has a rate of responsiveness and a consequent rate of deflection so as to increase its shadow on actuator 54 at a lesser rate than the rate of exposure of actuating means 54 due to the changing position of the heat source relative to the servomechanism 50. Thus, the movable shadow element provides a damping effect on the motion of the actuating means.

It should be understood that while the two embodiments described above utilize an actuating means and a movable shadow means which comprise bimetallic elements, the invention also encompasses configurations in which other types of heat responsive elements or devices are utilized. It is also apparent that only a portion of these means must be heat responsive. Furthermore, it should also be understood that while the actuating means is shown and described as a flat bimetallic strip, the means could also comprise, a spirally-laid bimetallic rod, spirally-wound bimetallic strip or a linear high-expansion element whose linear motion is converted to rotary motion by using a separate mechanical linkage.

In FIGURES 3 through 5, there is shown a body 80, such as a vehicle adapted for space travel, which has arms extending therefrom, only one arm 82 being shown, and a servomechanism 84 responsive to a radiant heat source of the type above-described mounted on the end of arm 82. Using two servomechanisms 84 mounted on diametrically opposed arms 82 of a space craft vehicle will provide a passive, single-axis attitude control system for the vehicle. Using four of such devices will implement an attitude control system which is effective about two axes.

Servomechanism 84 comprises a fixed shadow element 86, actuating means 88, movable shadow means 90 and a solar pressure vane 92 mounted on the outer end of actuating means 88. The solar pressure vane 92 functions so as to produce a force in the same direction as the direction of energy from a heat source which is directed upon the solar pressure vane. When the area of the solar pressure vane 92 which is exposed to a heat source, such as the sun, increases, the force due to the solar pressure increases proportionately. To force exerted on vane 92 crates a torque about the center of mass 94 of the vehicle 80. Thus, with the energy of the sun in a direction 96, as indicated in FIGURE 3, rotation of vane 92 in a clockwise direction, as viewed in FIGURE 3, will increase the torque about center of mass 94 so as to change the orientation of vehicle 80 with respect to the sun.

Since servomechanism 84 may be the same as the device described in FIGURE 1, only the operation of the servomechanism in combination with the vehicle 80 will here be described. In FIGURE 3, the vehicle is shown in a normal, steady-state attitude in which the longitudinal axis 98 of the vehicle is coincident with the direction of the energy from the sun. The solar pressure vane 92, in its initial steady-state position, is inclined to the transverse axis 100 of the vehicle at an angle $\alpha$. The damping element 90 is also in a steady-state undeflected position and the heat responsive portion of actuating means 88 is shadowed by the fixed shadow element 86.

When the vehicle 80 attitude changes relative to the direction of energy from the sun, as shown in FIGURE 4, so that longitudinal axis 98 is not coincident with the direction of energy from the sun, the servomechanism 84 changes the position of vane 92. This change in position is effected by exposure of the heat responsive portion of actuating means 88 to the sun causing rotation of the bimetallic actuating element and decreasing the angle $\alpha$ so that a greater portion of solar pressure vane 92 is exposed to energy from the sun. The increased force on vane 92 creates a torque which tends to decrease the rotation of the vehicle with respect to the sun. The damping element 90 is also deflected due to exposure to the sun, although its movement is time delayed relative to the movement of actuating means 88.

The third phase of control is shown in FIGURE 5, wherein the torque due to the motion of pressure vane 92 reduces the rate of rotation of the vehicle. The damping element 90, which continues to deflect, casts a larger shadow over the responsive portion of actuating means 88 than would be cast by the fixed shadow element 86 alone. In this manner, the element 90 provides a damping action to the counter-rotation of the vehicle produced by the solar vane by anticipating the impending movement of the vehicle; the acceleration of the vehicle back towards the position of FIGURE 4 is decreased by slowing and eventually reversing the motion of the solar pressure vane by shadowing the responsive portion of the actuating means. The action of the movable shadow means, therefore, damps the vehicle oscillation which would otherwise occur. An effective two-axis control system for a vehicle is thus provided by the use of a plurality of servomechanisms responsive to a heat source properly positioned on the vehicle.

While several embodiments of the present invention have been shown and described, it will be obvious to those skilled in the art that changes and modifications may be made without departing from the invention in its broader aspects. Moreover, while a particular embodiment of a control system comprising a plurality of servomechanisms responsive to a heat source constructed in accordance with the present invention has been shown and described, it will also be obvious to those skilled in the art that changes and modifications may be made without departing from the invention in its broader aspect. Accordingly, the aim in the appended claims is to cover all such changes and modifications as fall within the true spirit and scope of the invention.

I claim:

1. A radiant heat source orientation device comprising:

(a) a base member;

(b) actuating means carried by said base member including a portion responsive to energy from a radiant heat source, said responsive portion producing a movement of said actuating means when exposed to a heat source;

(c) fixed shadow means carried by said base member so as to shadow the responsive portion of said actuating means from a radiant heat source when said heat source is in a first position relative to said device and to expose said responsive portion of said actuating means to said heat source when said heat source is in a second position relative to said device; and (d) deflectable shadow means carried by said base member having a portion responsive to energy from a radiant heat source, said responsive portion of said deflectable shadow means producing a movement of said deflectable shadow means so as to shadow the responsive portion of said actuating means when said heat source is in said second position relative to said device.

2. The radiant heat source orientation device of claim 1 wherein the responsiveness of the responsive portion of said deflectable shadow means is delayed relative to the responsiveness of the responsive portion of said actuating means, whereby the movement of said deflectable shadow means is initially delayed relative to the movement of said actuating means when said heat source is in said second position and thereafter produces a damping effect on the movement of said actuating means.

3. The radiant heat source orientation device of claim 2 wherein said actuating means portion responsive to energy from a radiant heat source is a bimetallic element.

4. The radiant heat source orientation device of claim 2 wherein said deflectable shadow means portion responsive to energy from a radiant heat source is a bimetallic element.

5. A position control system for a movable body comprising a plurality of radiant heat source orientation devices carried by said body, each of said devices including;

(a) actuating means carried by said body at one end including a portion responsive to energy from a radiant heat source, said responsive portion rotating the other end of said actuating means toward a heat source when exposed to said heat source;

(b) fixed shadow means carried by said body so as to shadow the responsive portion of said actuating means from a radiant heat source when the radiant heat source is in a first position relative to said body and to expose the responsive portion of said actuating means to energy from a radiant heat source when the radiant heat source is in a second position relative to said body;

(c) means for rotating said body from said second position towards said first position, said body rotating means mounted on the other end of said actuating means, and (d) deflectable shadow means, carried by said body, having a portion responsive to energy from a radiant heat source, said responsive portion of said deflectable shadow means deflecting said latter means so as to shadow the responsive portion of said actuating means when the radiant heat source is in said second position relative to said body.

6. The position control system for a movable body of claim 5 wherein said means for rotating said body of each of said radiant heat source orientation devices comprises a solar pressure vane which when rotated toward said radiant heat source produces a counter-rotation of said body.

7. The position control system for a movable body of claim 5 wherein said deflectable shadow means of each of said radiant heat source orientation devices partially shadows the exposed responsive portion of said actuating means when the radiant heat source is in said second attitude relative to said body so as to damp the rotation rate of said actuating means and thereby damp the counter-rotation rate of said body.

8. The position control system for a body of claim 7 wherein the responsive portion of said actuating means of each of said radiant heat source orientation devices comprises a bimetallic element.

9. The position control system for a body of claim 8 wherein the responsive portion of said deflectable shadow means of each of said radiant heat source orientation devices comprises a bimetallic portion.

10. The attitude control system for a body of claim 9 wherein the body is a vehicle.

11. A radiant heat source responsive device comprising:

(a) a base member;

(b) actuating means having one end supported by said base member, said actuating means having a portion thereof responsive to energy from a radiant heat source for producing movement of said actuating means;

(c) fixed shadow means supported by said device and positioned thereon so as to expose the responsive portion of said actuating means when said heat source is in a first position relative to said responsive portion of said actuating means and to shadow the responsive portion of said actuating means when said heat source is in a second position relative to said responsive portion of said actuating means; and (d) movable shadow means supported by said device having a portion responsive to energy from a radiant heat source for producing movement of said movable shadow means, said movable shadow means responsive portion having a delayed energy responsiveness relative to that of said responsive portion of said actuating means, said movable shadow means thereafter movable so as to partially shadow said responsive portion of said actuating means when said fixed shadow means exposes the responsive portion of said actuating means due to the position of said heat source relative to said responsive portion of said actuating means.

12. A radiant heat source responsive device comprising:

(a) a base member;

(b) actuating means having one end supported by said base member, said actuating means moving in response to heat applied thereto from a radiant heat source;

(c) fixed shadow means supported by said base member and position thereon so as to shadow said actuating means in proportion to the relative position of said actuating means to said heat source;

(d) deflectable shadow means supported by said fixed shadow means, said deflectable shadow means deflecting in response to heat applied thereto from said radiant heat source, said deflectable shadow means responsive so that deflection thereof shadows said actuating means inversely to shadowing by said fixed shadow means.

13. The radiant heat source responsive device of claim 12 wherein said deflectable shadow means responsive so that deflection thereof shadows said actuating means inversely to shadowing by said fixed shadow means includes means for delaying deflection response thereby producing a time lag between inversely proportional shadowing by said deflectable shadow means and shadowing by said fixed shadow means.

14. The radiant heat source responsive device of claim 13 wherein said deflectable shadow means comprises a bimetallic member.

15. The radiant heat source responsive device of claim 14 wherein the means for delaying deflection response of said deflectable shadow means comprises a layer of insulation disposed on said bimetallic member.

References Cited by the Examiner

UNITED STATES PATENTS

| | | | |
|---|---|---|---|
| 3,206,141 | 9/1965 | Vivian et al. | 244—1 |
| 3,239,165 | 3/1966 | Sohn | 244—1 |

References Cited by the Applicant

UNITED STATES PATENTS 3,116,035 12/1963 Cutler.

OTHER REFERENCES

Astronautics and Aerospace Engineering, April 1963, pages 42–45; September 1963, pp. 19 and 89.

Aviation Week, Jan. 27, 1964, pp. 71 and 75.

FERGUS S. MIDDLETON, *Primary Examiner*